(12) United States Patent
Maeda

(10) Patent No.: US 9,080,879 B2
(45) Date of Patent: Jul. 14, 2015

(54) DISPLAY TERMINAL AND SERVER INSTALLED IN VEHICLE

(71) Applicant: Panasonic Intellectual Property Management Co., Ltd., Osaka-shi, Osaka (JP)

(72) Inventor: Tsuyoshi Maeda, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/260,244

(22) Filed: Apr. 23, 2014

(65) Prior Publication Data

US 2014/0324333 A1     Oct. 30, 2014

(30) Foreign Application Priority Data

Apr. 24, 2013   (JP) ................. 2013-091429

(51) Int. Cl.
| | | |
|---|---|---|
| *G01C 21/00* | (2006.01) | |
| *G08G 3/00* | (2006.01) | |
| *G01C 21/20* | (2006.01) | |

(52) U.S. Cl.
CPC ..................... *G01C 21/20* (2013.01)

(58) Field of Classification Search
CPC ......... G08G 1/017; G08G 1/04; G08G 1/015;
G08G 1/0175; G08G 1/01; G08G 1/052;
G08G 1/142; G07B 15/063; G07B 15/02;
B60R 11/0211; B60R 11/04; G08B 13/19695;
G08B 13/19641; G08B 13/19656
USPC ................ 701/400–541; 340/988–996, 963,
340/967–970, 973, 974, 975, 977, 978;
703/3, 4, 5, 6, 7, 8, 10, 15, 16, 18, 24,
703/25, 26, 27, 38
See application file for complete search history.

(56) References Cited

U.S. PATENT DOCUMENTS

| | | | |
|---|---|---|---|
| 6,289,277 B1 | 9/2001 | Feyereisen et al. | |
| 7,257,405 B2 | 8/2007 | Yamato et al. | |
| 8,374,594 B2 | 2/2013 | Yamato et al. | |
| 2001/0034239 A1 | 10/2001 | Yamato et al. | |
| 2005/0165543 A1* | 7/2005 | Yokota | 701/204 |
| 2007/0129072 A1 | 6/2007 | Yamato et al. | |
| 2010/0057275 A1* | 3/2010 | Schilke et al. | 701/14 |
| 2010/0211301 A1* | 8/2010 | McClellan | 701/119 |

FOREIGN PATENT DOCUMENTS

| | | | |
|---|---|---|---|
| JP | 2001-309420 A | 11/2001 | |
| JP | 2003-511749 A | 3/2003 | |
| JP | 2004-304298 A | 10/2004 | |
| JP | -2007-295413 | * 11/2007 | |
| JP | 2007-295413 A | 11/2007 | |
| WO | 2001-25727 A1 | 4/2001 | |

* cited by examiner

*Primary Examiner* — Muhammad Shafi
(74) *Attorney, Agent, or Firm* — Shinjyu Global IP

(57) ABSTRACT

A smartphone (10) includes an area information obtaining unit (17), a map information obtaining unit (18), and a display unit (12). The area information obtaining unit (17) obtains area information indicating at least one area communicable directly or indirectly. The map information obtaining unit (18) obtains location information indicating a location associated with the airplane (2). The display unit (12) displays the area information and the location information in a superimposed manner.

13 Claims, 11 Drawing Sheets

DISPLAY TERMINAL AND SERVER INSTALLED IN VEHICLE

CROSS-REFERENCE TO RELATED APPLICATIONS

This application claims priority to Japanese Patent Application No. 2013-091429 filed on Apr. 24, 2013, the entire contents of which are incorporated by reference herein.

BACKGROUND

1. Technical Field

The disclosure relates to display terminals such as mobile telephones, smartphones, tablet computers, and notebook computers, and seat monitors installed in airplanes, and also relates to servers installed in vehicles.

2. Description of the Related Art

Display terminals including mobile telephones move together with vehicles, such as airplanes, automobiles, trains, and ships. Such a display terminal may communicate while moving through multiple areas covered by multiple base stations.

For example, one method for wireless communication described in Patent Literature 1 (Japanese Unexamined Patent Publication No. 2007-295413) enables the reception intervals of wireless base stations or the like to be set in an appropriate manner for a display terminal moving through multiple areas covered by multiple wireless base stations, or moving particularly at a substantially constant speed along an automobile road, such as an express highway.

However, the above conventional wireless communication method has the problems described below.

When the display terminal moves through multiple areas corresponding to multiple base stations, the method described in the above publication fails to provide the user of the display terminal with information to determine, by a quick view, the base station covering the area in which the display terminal is currently located or the communicable time remaining in the current area.

It is an object of the disclosure to provide a display terminal that enables a user to determine, by a quick view, communicable base stations when moving inside and outside an area covered by a communicable base station, and to provide a server installed in a vehicle.

SUMMARY

A display terminal of the disclosure is a display terminal that moves together with a vehicle. The display terminal includes an area information obtaining unit, a location information obtaining unit, and a display unit. The area information obtaining unit obtains area information indicating at least one area communicable directly or indirectly. The location information obtaining unit obtains location information indicating a location associated with a vehicle. The display unit displays the area information and the location information in a superimposed manner.

A vehicle server of the disclosure is a server that is installed in a vehicle to transmit and receive information to and from a display terminal. The server includes an area information obtaining unit, a location information obtaining unit, and a communication unit. The area information obtaining unit obtains area information indicating at least one area communicable directly or indirectly with the display terminal. The location information obtaining unit obtains location information indicating a location associated with the vehicle. The communication unit transmits, to the display terminal, information generated by superimposing the area information on the location information.

Advantageous Effects

The display terminal of the disclosure displays information indicating communicable areas and information indicating the current location of the vehicle in a superimposed manner to enable the user to determine, by a quick view, whether the terminal is currently communicable.

DETAILED DESCRIPTION OF THE EMBODIMENTS

First Embodiment

A smartphone (display terminal) 10 according to one embodiment of the disclosure will now be described with reference to FIGS. 1 to 5.

In the present embodiment, an airplane 2 (refer to FIG. 2), which is an example of a vehicle, will now be described. The airplane 2 moves from area A to area B and to area C on a flight route 2a (route from Japan to the United States) shown in FIG. 3.

Smartphone 10

Figure 1:
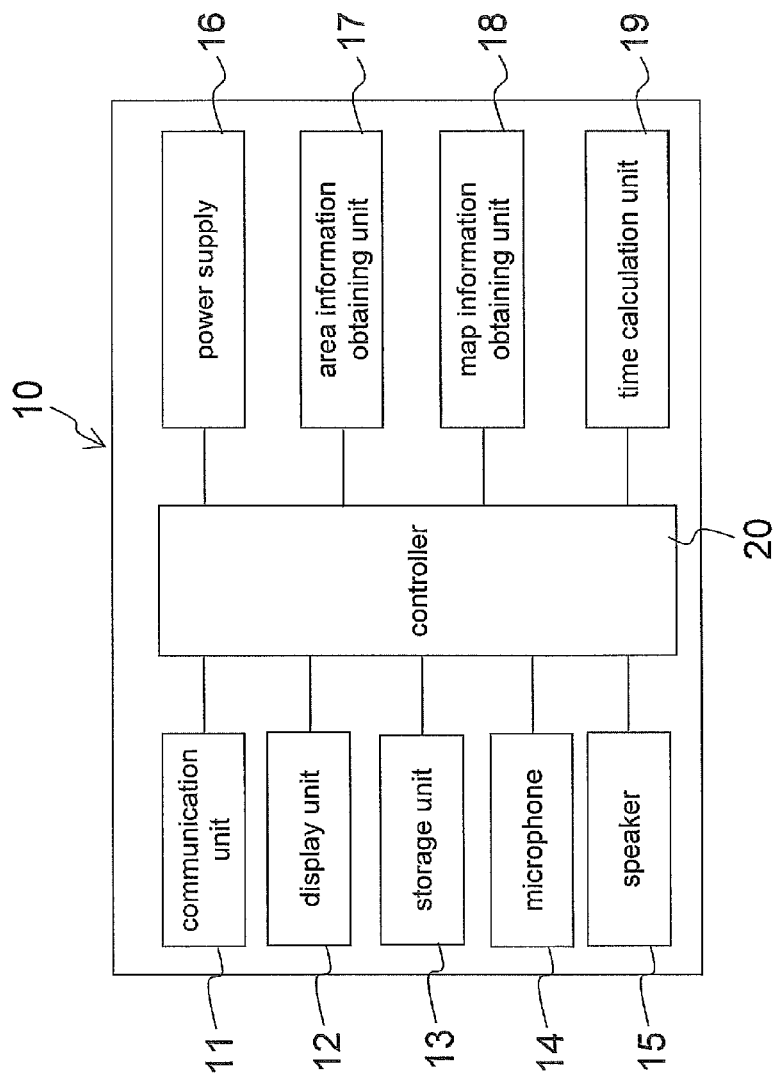
FIG. 1 is a control block diagram showing the structure of a smartphone according to one embodiment of the disclosure.

As shown in FIG. 1, a smartphone (SF) (display terminal) 10 according to the present embodiment includes a communication unit 11, a display unit 12, a storage unit 13, a microphone 14, a speaker 15, a power supply 16, an area information obtaining unit 17, a map information obtaining unit (location information obtaining unit) 18, a time calculation unit 19, and a controller 20.

The communication unit 11 communicates with external devices, such as other smartphones, mobile telephones, personal computers, and external servers by phone, e-mail, or the Internet using, for example, 3G/4G networks, WiFi, Bluetooth (registered trademark), or near field communication (NFC).

In the present embodiment, the communication unit 11 located inside the airplane 2 communicates with external devices (satellites 41a to 41d) via wireless access points (wireless APs) 32 (refer to FIG. 2), which are described later, and also via a communication unit (communication device) 34a (refer to FIG. 4) included in the in-flight server 34.

The display unit 12 includes a touch panel display screen 12a, and also functions as an input unit. The display unit 12 can display the settings of the smartphone 10, phone calls, e-mails, and also various websites or other information through the Internet.

The storage unit 13 stores sets of information including contact information, images, and music data stored in the smartphone 10. In the present embodiment, the storage unit 13 further stores area information indicating communicable areas corresponding to terrestrial base stations 42a to 42d (satellites 41a to 41d) (refer to FIG. 3), which are described later, and map information indicating the moving-route map of the airplane 2.

The microphone 14 captures voice information of the user when the user makes a phone call using the smartphone 10.

The speaker 15 outputs voice information of the call recipient when the user makes a phone call using the smartphone 10, and also replays music or voice memo stored in the smartphone 10 or in the Cloud storage on the Internet.

The power supply 16 supplies power to the components of the smartphone 10 including the communication unit 11 and the display unit 12.

The area information obtaining unit 17 obtains information about communicable areas A to D, which are covered by the terrestrial base stations 42a to 42d (refer to FIG. 3) communicable with the smartphone 10 via the wireless APs 32, the communication unit 34a included in the in-flight server 34, and the satellites 41a to 41d.

In the present embodiment, such area information indicating the areas that are communicable with the smartphone 10 via the communication unit 34a of the in-flight server 34 in the airplane 2 may be the latest area information obtained from the in-flight server (the server installed in the vehicle) 34, or may be the area information provided from the contract provider and prestored in the storage unit 13 of the smartphone 10, or may further be the area information obtained through the Internet.

Figure 3:
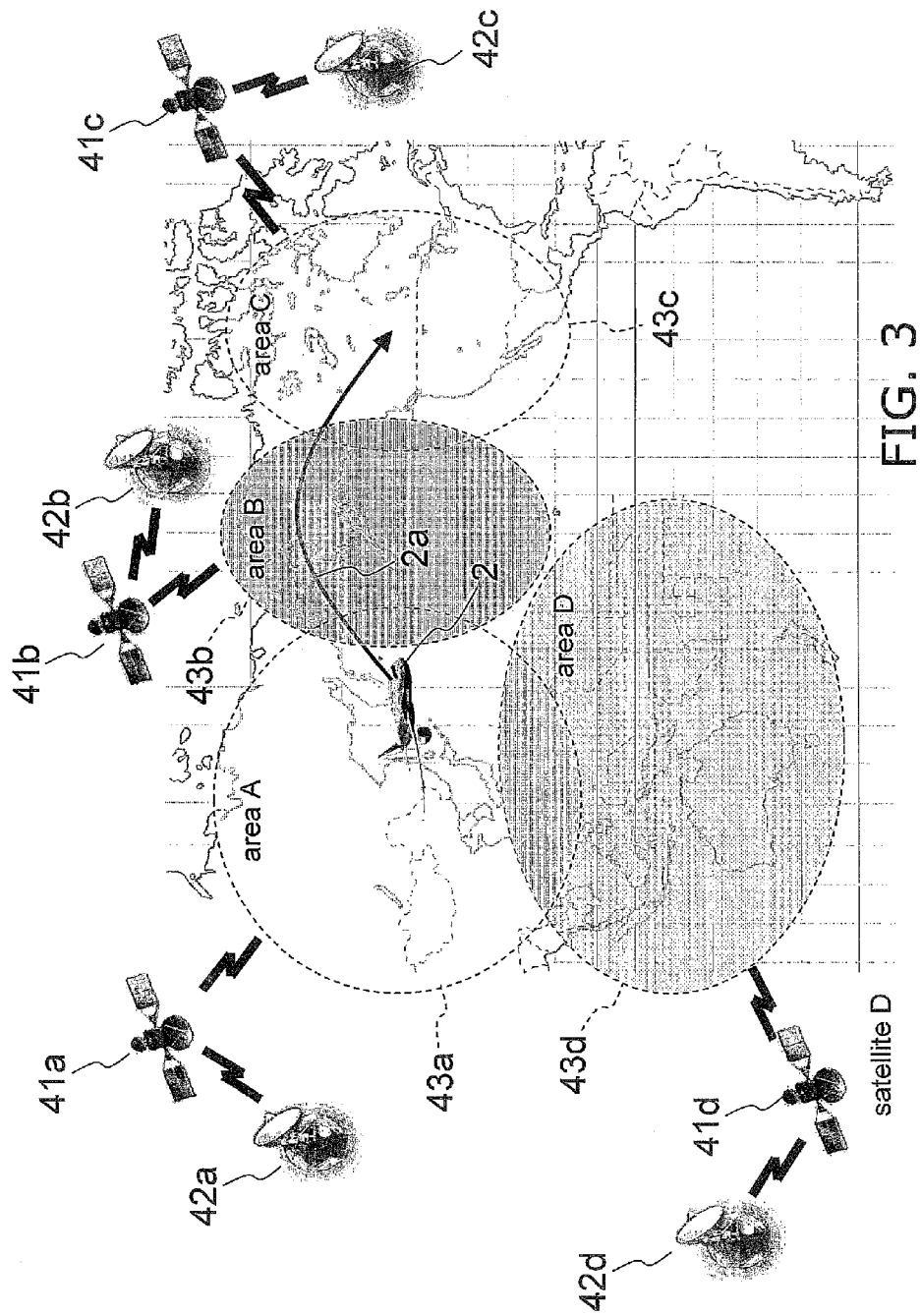
FIG. 3 shows a display example of communicable areas covered by base stations (satellites) superimposed on a route map of the airplane shown in FIG. 2.

As shown in FIG. 3, the map information obtaining unit 18 obtains map information indicating a flight route (moving route) 2a of the airplane 2 on the world map.

In the present embodiment, such map information may be the information obtained from the in-flight server 34, which is installed in the airplane 2 to store sets of information including the flight route 2a of the airplane 2 and the current location of the airplane 2, or may be the information about the flight route 2a of the airplane 2, which is obtained by the user intending to board the airplane 2 via the Internet and stored into the storage unit 13.

The time calculation unit 19 uses sets of information including information about the current location of the airplane 2, the movement speed, and the distance to the boundary of each of the areas A to D communicable with the smartphone 10 via the airplane 2. Using these sets of information, the time calculation unit 19 calculates the remaining communicable time in, for example, the area A in FIG. 3 in which communication is currently enabled.

In the present embodiment, the information including the current location and the movement speed of the airplane 2 is obtained from the in-flight server 34.

Figure 5:
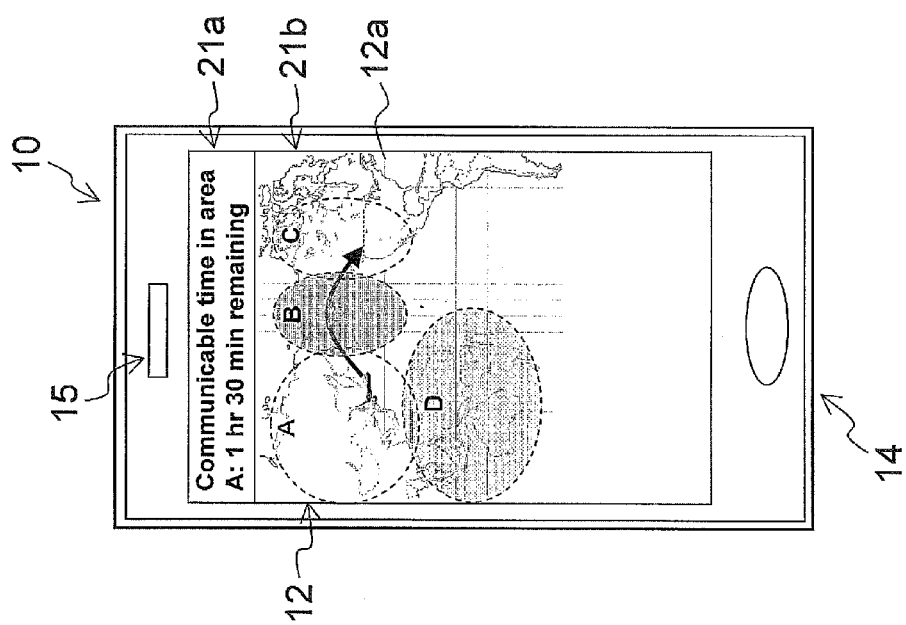
FIG. 5 shows a display example of information appearing on the display screen of the smartphone shown in FIG. 1.

The controller 20 controls the components including the communication unit 11 and the display unit 12, and combines the sets of information obtained from the area information obtaining unit 17, the map information obtaining unit 18, and the time calculation unit 19, and displays the resulting information on the display screen 12a of the display unit 12 (refer to FIG. 5).

The control performed by the controller 20 for displaying the map information will be described below in detail.

In-Flight Network 30 of Airplane 2

Figure 2:
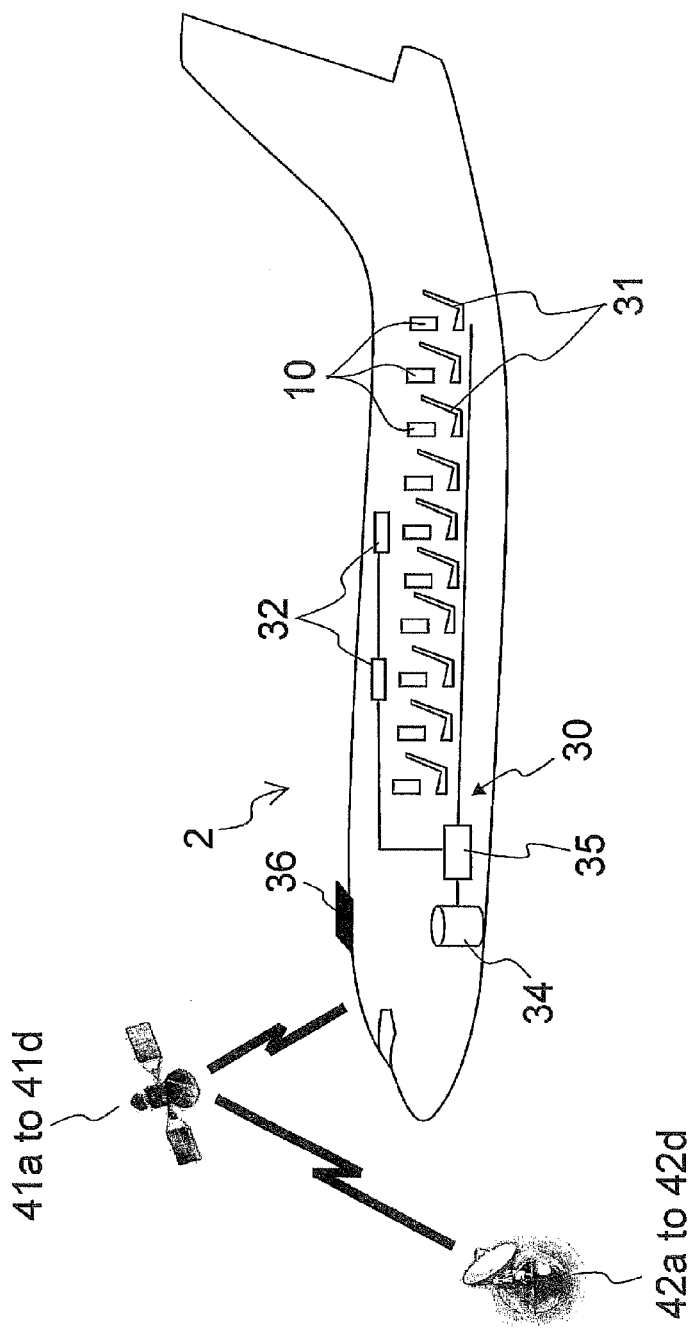
FIG. 2 is a schematic diagram of a communication network provided in an airplane that moves together with the smartphone shown in FIG. 1.

As shown in FIG. 2, the airplane 2 that the user of the smartphone 10 boards in the present embodiment includes an in-flight network 30, and a plurality of seats 31 on which passengers are to be seated.

As shown in FIG. 2, the in-flight network 30 includes smartphones 10 carried into the airplane by the passengers (users), a plurality of wireless access points (hereafter referred to as wireless APs) 32, an in-flight server (server installed in the vehicle) 34, a network switch 35, and an antenna 36.

The wireless APs 32 are installed in the airplane to enable wireless communication between the smartphones 10 carried into the airplane 2 and the in-flight server 34. The wireless APs 32 are connected to the network switch 35. Wireless connection using the wireless APs 32 is performed by, for example, WiFi, NFC, or other methods.

The in-flight server 34 stores sets of information including information indicating the flight route 2a of the airplane 2, the movement speed, and the current location, and map information indicating areas in which the airplane 2 can fly on the world map or the map of Japan. The in-flight server 34 transmits these sets of information to the smartphone 10 in response to a request from each smartphone 10. The in-flight server 34 further stores content information, such as movies, TV programs, music, and games, which can be provided to a seat monitor (not shown) installed on the back of each seat 31.

The network switch 35, which connects with the seat monitors (not shown) each installed on the back of the seat 31, distributes the above content information from the in-flight server 34 to the wireless APs 32 and to the seat monitors.

The antenna 36 is mounted on the front top of the airplane 2 as shown in FIG. 2, and is controlled and directed toward the satellites 41a to 41d with which the antenna intends to communicate.

Figure 8:
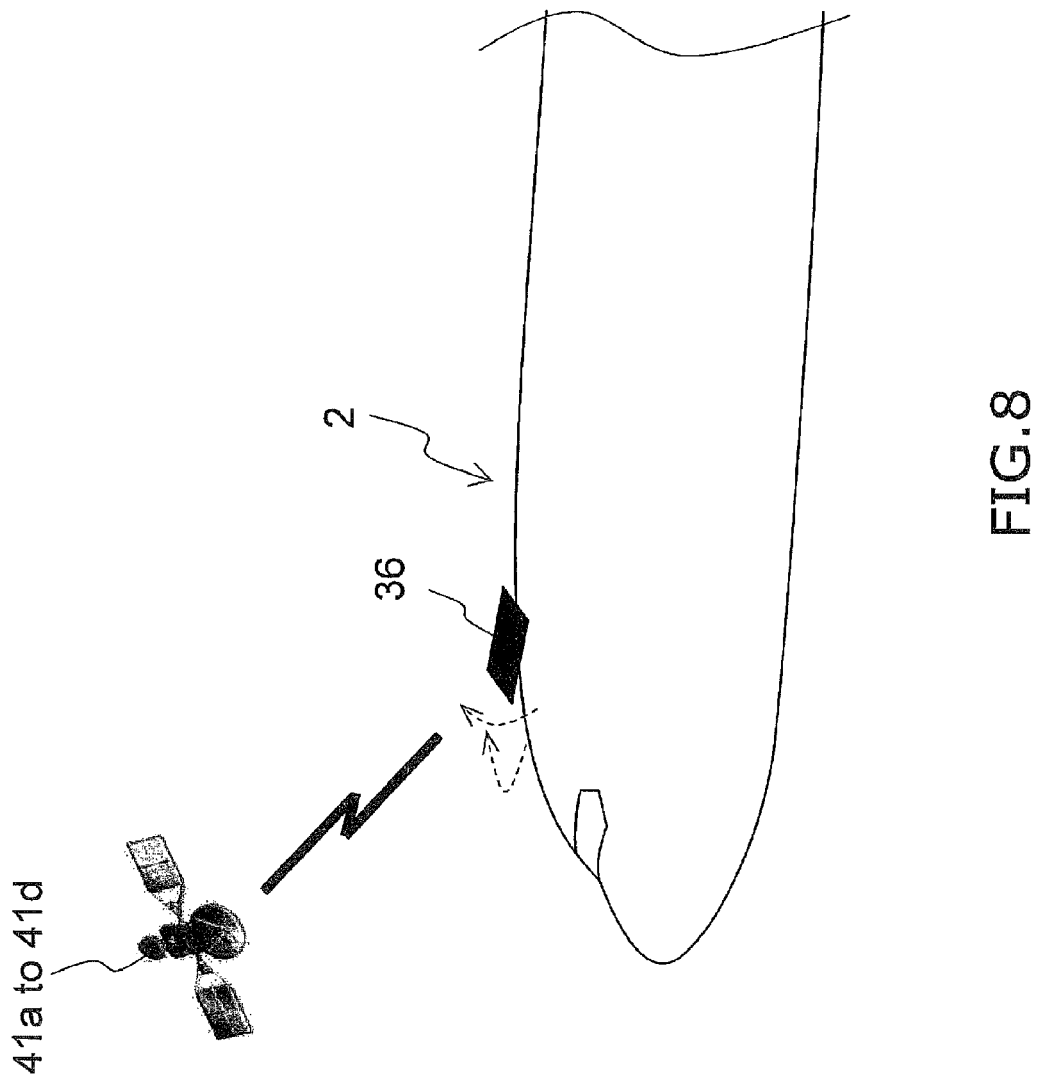
FIG. 8 is a diagram showing a movable antenna mounted on the airplane shown in FIG. 2.

As shown in FIG. 8, the antenna 36 is movable and can be directed toward the satellites 41a to 41d with which the antenna intends to communicate. For example, the antenna 36 can be driven by, for example, a motor, and can be directed horizontally and vertically as shown in FIG. 8.

Figure 4:
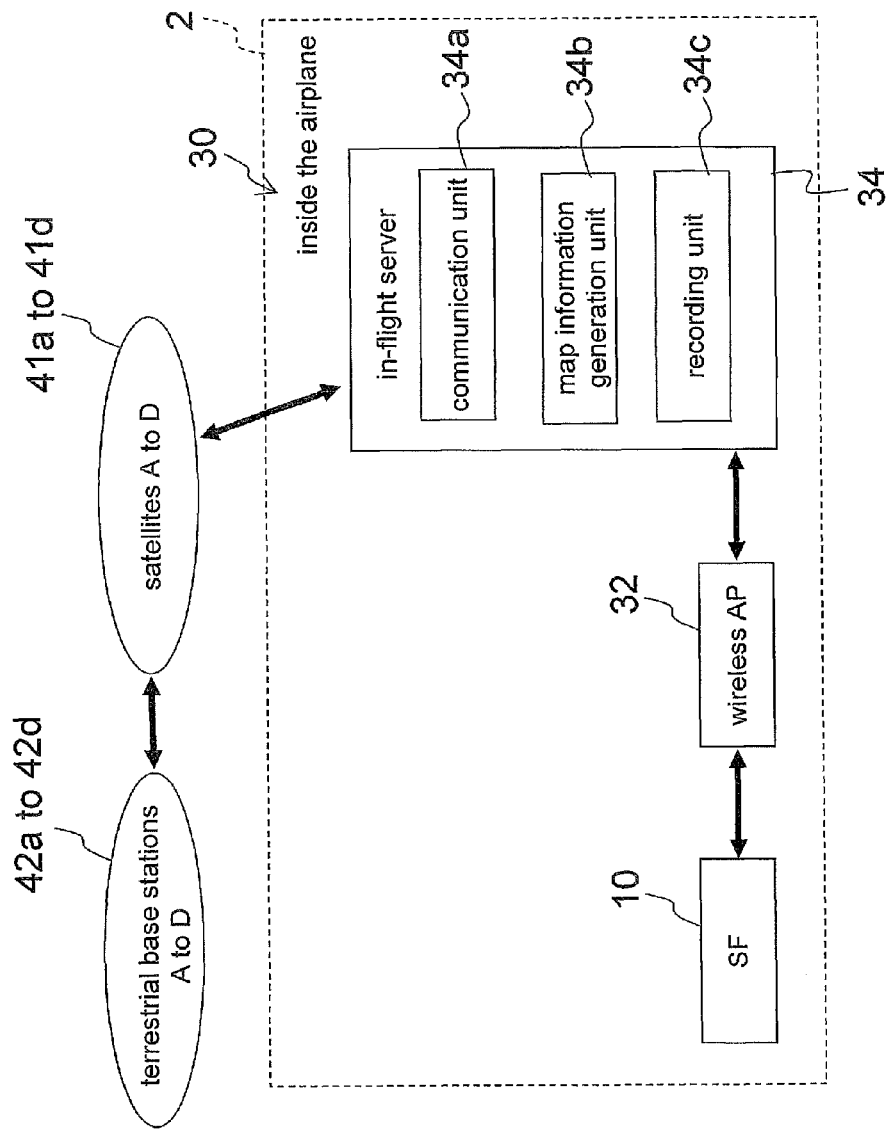
FIG. 4 is a schematic diagram of a communication network connecting the smartphone shown in FIG. 1, an in-flight server, and base stations.

In the present embodiment, as shown in FIG. 4, the in-flight server 34 can transmit and receive information to and from the smartphones 10 via the wireless APs 32 installed in the airplane 2, and to and from the terrestrial base stations 42a to 42d via the satellites 41a to 41d. The in-flight server 34 accommodates a communication unit 34a, a map information generation unit 34b, and a recording unit 34c.

The communication unit 34a communicates with the smartphone 10 via the wireless APs 32. The communication unit 34a can also communicate with external devices in response to a request from the smartphone 10 by accessing the terrestrial base stations 42a to 42d via the satellites 41a to 41d using the antenna 36.

The map information generation unit 34b generates map information including the flight route 2a using the information about the flight route 2a of the airplane 2.

The recording unit 34c stores sets of information including information about the flight route 2a of the airplane 2, which is used by the map information generation unit 34b to generate map information, and information about the current location of the airplane 2 and the movement speed. The recording unit 34c also stores area information, or information indicating the areas A to C communicable with devices located inside the airplane 2, which is obtained from external devices.

External Network

In the present embodiment, the flight route 2a of the airplane 2 shown in FIG. 2 extends through the three areas A to C.

As shown in FIG. 3, the areas A to C can be the areas communicable with the smartphone 10 via the airplane 2, which are set in accordance with the contract conditions of the provider for the user. The satellites communicable with the communication unit 34a of the in-flight server 34 in the airplane 2 are determined by the contract conditions for the airplane 2 or for various devices installed in the airplane 2.

The area A enables communication with the terrestrial base station 42a via the satellite 41a. The area B enables communication with the terrestrial base station 42b via the satellite 41b. The area C enables communication with the terrestrial base station 42c via the satellite 41c. The area D, which is outside the flight route 2a in this example, is to enable communication with the terrestrial base station 42d via the satellite 41d.

When, for example, the airplane 2 moves from the area A to the area B, the smartphone 10 first disables its communication with the satellite 41a covering the area A via the airplane 2, and then resumes communication with the satellite 41b covering the area B via the airplane 2.

The communication status of the satellites 41a to 41d is preferably managed on the ground. The communication status of the satellites 41a to 41d, or specifically the information about the communicable satellites 41a to 41d, may be updated when, for example, the airplane 2 is parked or when the communication is established during flight.

Control for Displaying Communication Status on Smartphone 10

In the present embodiment, the user on board the airplane 2 can check the communication status of the smartphone 10 by operating the smartphone 10 to display the communication status information on the display screen 12a, and viewing the map information shown in FIG. 5.

In the example shown in FIG. 5, the display screen 12a of the smartphone 10 includes a time information display area 21a on its top, and a map information display area 21b in the middle.

Displaying Time Information

The time information display area 21a displays the remaining communicable time for the areas A to C along the flight route 2a. In FIG. 5, the current location of the airplane 2 is within the area A, and the time information display area 21a displays the remaining communicable time for the area A.

The smartphone 10 in the present embodiment uses the area information, the map information, the information indicating the location and the movement speed of the airplane 2, and the time information, which are obtained by the area information obtaining unit 17, the map information obtaining unit 18, and the time calculation unit 19 shown in FIG. 1.

Using these sets of information, the smartphone 10 displays the areas A to D, which are communicable via the airplane 2, on the display screen 12a of the display unit 12 in a manner that the communicable areas are superimposed on the moving-route map shown in FIG. 5.

More specifically, the time calculation unit 19 calculates the remaining time before the airplane 2 reaches the boundary of, for example, the area A using the information about the communicable areas A to D, the information about the location of the airplane 2, and the information about the movement speed based on the flight plan, which are obtained from the in-flight server 34 by the area information obtaining unit 17.

The above time information, or specifically the remaining time calculated by the time calculation unit 19, appears in the time information display area 21a on the display screen 12a of the display unit 12.

In the present embodiment, the smartphone 10 may further display information about the switching time from one satellite to another, or specifically from the satellite (terrestrial base station) currently connected to the communication unit 34a of the in-flight server 34 in the airplane 2 to the next communication target satellite (terrestrial base station) when the smartphone 10 communicates through multiple areas A to D communicable at the current location of the airplane 2.

The communication is temporarily disabled during this switching time, in which the antenna 36 previously directed toward the communication target satellite of the airplane 2, for example, the satellite 41a, is redirected toward the next communication target satellite, for example, the satellite 41b.

More specifically, the direction of the antenna 36 is adjustable vertically and horizontally as shown in FIG. 8. The time taken to direct the antenna 36 toward the satellite 41b is calculated as the above switching time.

The satellite to communicate with the antenna 36 may be selected from the satellites 41a to 41d. For example, the passenger (user) may select the satellite by operating the smartphone 10 using the area information and other information obtained from the in-flight server 54. In this case, the passenger may view the area information displayed on the smartphone 10, and select an area in which more stable communication will be likely. As a result, the corresponding satellite will be automatically selected for communication.

This provides the user with information about such communication-disabled time during which communication is temporarily disabled for the area switching.

In the present embodiment, the smartphone 10 may further display the time taken to enable communication with the next communication target satellite (terrestrial base station) when the communication is switched to the other satellite (terrestrial base station) communicable with the communication unit 34a of the in-flight server 34 in the airplane 2. The time taken to enable connection with the next target satellite (terrestrial base station) communicable with the communication unit 34a of the in-flight server 34 in the airplane 2 includes the switching time described above.

This provides the user with information about the time taken to move to the next communicable area when the communication is performed through multiple communicable areas.

In this case, the remaining communicable time and the time taken to enable connection with the next communication target satellite may be displayed at one time. The information to be displayed should not be limited to this.

Displaying Map Information

As shown in FIG. 5, the map information display area 21b also displays information indicating the areas A to D communicable with the smartphone 10 via the airplane 2 in a manner superimposed on the map information (world map) including the flight route 2a (refer to FIG. 3). Further, the map information display area 21b may display the information indicating the location of the airplane 2 (current location information) as shown in FIG. 5.

More specifically, the smartphone 10 in the present embodiment shown in FIG. 1 uses the area information, the map information, and the current location information of the airplane 2, and the time information, which are obtained by the area information obtaining unit 17, the map information obtaining unit 18, and the time calculation unit 19. Using these sets of information, the smartphone 10 displays the communicable areas A to D superimposed on the moving-route map shown in FIG. 5 on the display screen 12a of the display unit 12.

More specifically, the controller 20 displays the information generated by combining the map information and the area information shown in FIG. 5 on the display screen 12a of the display unit 12 using the information indicating the areas A to D communicable with the smartphone 10 via the airplane 2 obtained from the in-flight server 34 by the area information obtaining unit 17, the current location information of the airplane 2, and the map information including the flight route 2a obtained by the map information obtaining unit 18.

This allows the user of the smartphone 10 in the present embodiment to easily obtain information including the current communication status, the communicable areas, and the remaining communicable time simply by viewing the display screen 12a shown in FIG. 5.

When the communicable areas change at varying altitudes of the airplane 2, the smartphone 10 may obtain information about the current altitude of the airplane 2 from the in-flight server 34 and adjust the communicable areas using such area information, and display the resulting communicable areas on the display screen 12a of the display unit 12 together with the map information.

At a predetermined altitude or lower, the airplane 2 may be in the process of landing or taking off. In this case, which is unique to the airplane 2, the aviation law commonly prohibits use of electronics devices that have been carried into the airplane. When the airplane 2 is at a predetermined altitude or lower before or after entering the stabilized flight, which allows communication with electronic devices on the airplane, the smartphone 10 may display information about such an incommunicable area on the display screen 12a.

Second Embodiment

An in-flight server (server installed in a vehicle) 54 according to another embodiment of the disclosure will now be described with reference to FIG. 6.

The present embodiment will be described focusing on its components different from the components in the first embodiment, and the components in the present embodiment identical to the components in the first embodiment are given the same reference numerals as those components and will not be described in detail.

The present embodiment differs from the first embodiment in that the processing for displaying the map information and the area information in a superimposed manner, which is performed by the smartphone 10 in the airplane 2 in the first embodiment, is performed by an in-flight server 54 in the second embodiment.

In the present embodiment, a display terminal, such as a smartphone 10, simply receives, from the in-flight server 54, information about a moving-route map on which area information is superimposed and displays the received information to produce the same advantages as in the first embodiment.

Figure 6:
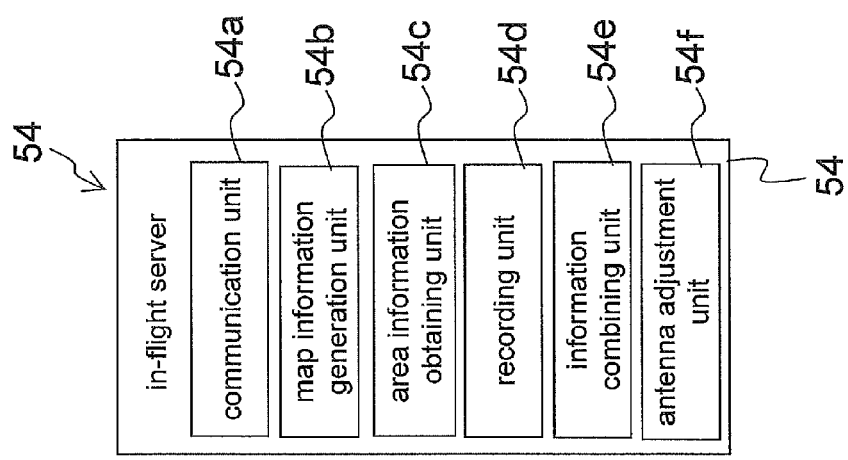
FIG. 6 is a control block diagram showing the structure of an in-flight server according to another embodiment of the disclosure.

As shown in FIG. 6, the in-flight server 54 in the present embodiment includes a communication unit 54a, a map information generation unit 54b, an area information obtaining unit 54c, a recording unit 54d, an information combining unit 54e, and an antenna adjustment unit 54f.

The communication unit 54a communicates with the smartphone 10 via a plurality of wireless access points (APs) 32 in the same manner as the communication unit 34a described above, and communicates with an external device by accessing terrestrial base stations 42a to 42d via satellites 41a to 41d in response to a request from the smartphone 10.

The map information generation unit 54b generates map information including a flight route 2a of an airplane 2 in the same manner as the map information generation unit 34b described above using information about the flight route 2a of the airplane 2.

The area information obtaining unit 54c obtains information indicating areas that are communicable with the smartphone 10 from, for example, the contract provider of the user of the smartphone 10 via the Internet. The information obtained by the area information obtaining unit 54c is preferably updated to the latest information when, for example, the airplane 2 is parked or when the communication is established during flight.

The recording unit 54d stores sets of information including the map information and the area information generated and obtained by the map information generation unit 54b and the area information obtaining unit 54c.

The information combining unit 54e generates information by superimposing the information indicating the areas communicable with the smartphone 10 via the airplane 2 on the flight route map including the flight route 2a of the airplane 2 using the map information and the area information generated and obtained by the map information generation unit 54b and the area information obtaining unit 54c.

Using the information obtained by the area information obtaining unit 54c and the information indicating the location of the airplane 2 (current location information), the antenna adjustment unit 54f transmits signals for directing a movable antenna 36 toward the satellites 41a to 41d with which the antenna intends to communicate. The signals transmitted from the antenna adjustment unit 54f are received by a controller (not shown), which centrally controls the airplane 2. The signals are used to adjust the direction of the antenna 36 mounted on the front top of the airplane 2.

In the present embodiment, the in-flight server 54 generates information by superimposing the area information indicating areas communicable with the smartphone 10 via the airplane 2 onto the flight route map including the flight route 2a of the airplane 2. The information resulting from the superimposition can then be transmitted to the smartphone 10 when the user operates the smartphone 10 to check the communication status.

As a result, the smartphone 10 simply displays the information transmitted from the in-flight server 54 on the display screen 12a of the display unit 12 to produce the same advantages as in the first embodiment.

The in-flight server 54 in the present embodiment performs the processing needed to produce the same advantages as in the first embodiment, while reducing the processing load on the smartphone 10.

In the present embodiment, the antenna adjustment unit 54f constantly obtains the current location information of the airplane 2 and the area information indicating areas in which communication is being performed. As a result, the movable antenna 36 is constantly directed toward the satellites 41a to 41d with which the antenna intends to communicate.

More specifically, the controller (not shown) receives signals transmitted from the antenna adjustment unit 54f, and drives, for example, a motor for driving the movable antenna 36, to direct the antenna 36 toward the satellites 41a to 41d with which the antenna intends to communicate.

To allow communication in a vehicle constantly moving in communicable areas, such as the airplane 2, the movable antenna 36 is directed toward the satellite with which the antenna intends to communicate. As a result, the receiving sensitivity of the antenna 36 can be maintained at its maximum independently of the location of the airplane 2 within the communicable areas, allowing the display terminal such as the smartphone 10 located inside the airplane 2 to be used in an appropriate communication environment.

The display terminal according to the disclosure has the features described below.

A display terminal according to a first aspect of the disclosure is a display terminal for moving together with a vehicle that moves along a predetermined moving route. The display terminal includes a communication unit, an area information obtaining unit, a map information obtaining unit, a display unit, and a display controller. The communication unit communicates with a base station in a communicable area. The area information obtaining unit obtains area information indicating a communicable area covered by a base station. The map information obtaining unit obtains information about a moving-route map of the vehicle. The display unit displays the moving-route map. The display controller controls the display unit to display the area information on the moving-route map.

In the display terminal that moves inside and outside an area covered by a base station (communicable area) together with a vehicle accommodating the display terminal or with an owner of the display terminal, the display unit displays one or more communicable areas corresponding to one or more base stations on the moving-route map.

The display terminal may be a portable display terminal, such as a mobile telephone or a smartphone, a tablet computer (personal computer), and a notebook computer, and may further be a monitor mounted on, for example, an airplane, a train, or a ship. The above vehicle may be a vehicle such as an airplane, a train, or a ship, or may also be a user who owns a mobile telephone or the like. The area information obtaining unit and the map information obtaining unit obtain the area information and the map information from an external device. Alternatively, the area information obtaining unit may obtain the area information and the map information generated in the display terminal.

The display terminal can display the communicable area information and the moving-route map information obtained by the area information obtaining unit and the map information obtaining unit in a superimposed manner on its display screen. As a result, the user of the display terminal can simply view the display screen to determine the base station corresponding to the communicable area in which the display terminal is currently located. The user of the display terminal can thus easily determine whether the display terminal is communicable at the current location.

A display terminal according to a second aspect of the disclosure is a display terminal of the first aspect of the disclosure in which the communication unit communicates with a plurality of base stations covering different communicable areas.

In the display terminal that moves through areas (communicable areas) covered by a plurality of base stations together with a vehicle accommodating the display terminal or with an owner of the display terminal, the display unit displays a communicable area corresponding to each base station on a moving-route map.

This display terminal can display communicable areas covered by a plurality of base stations when, for example, moving from one continent to another by airplane or the like.

A display terminal according to a third aspect of the disclosure is a display terminal of the first or second aspect of the disclosure in which the display controller controls the display unit to display location information indicating a location of the display terminal on a moving-route map.

In this display terminal, the display unit displays the location information on the moving-route map on which the communicable areas corresponding to the base stations are displayed.

The location information of the display terminal may be, for example, location information obtained using the global positioning system (GPS) functions.

The user of the display terminal can easily determine the location of the display terminal in the corresponding communicable area simply by viewing the display screen. As a result, the user of the display terminal can determine, for example, the remaining communicable time at the current position.

A display terminal according to a fourth aspect of the disclosure is a display terminal of one of the first to third aspects of the disclosure further including a time calculation unit. The time calculation unit calculates a communicable time for which the display terminal is communicable with a base station. The display controller controls the display unit to display the communicable time calculated by the time calculation unit on the moving-route map.

In the display terminal moving together with a vehicle along a predetermined moving-route map, the remaining communicable time, or the time taken to enable communication with the next base station, is calculated based on a current location, a movement speed, and an operation schedule of the vehicle, and a communicable area corresponding to a specific base station. Such time information is displayed together with the moving-route map including the communicable area.

This allows the user of the display terminal to easily obtain information including the remaining communicable time for the specific base station.

A display terminal according to a fifth aspect of the disclosure is a display terminal of the fourth aspect of the disclosure in which the time calculation unit calculates a communicable time using the current location, the movement speed, or the operation schedule of the vehicle, and the area information indicating an area covered by a base station.

Such time information is calculated using the information about areas corresponding to the base stations, the current location and the movement speed of the vehicle, and other information.

This allows the user of the display terminal to roughly determine the remaining communicable time or the time taken to enable communication with a specific base station.

A display terminal according to a sixth aspect of the disclosure is a display terminal of one of the first to fifth aspects of the disclosure in which the display controller controls the display unit to display a communicable area included in the moving-route map.

The display terminal determines whether a communicable area is to appear on the moving-route map based on whether the communicable area is included in the moving route.

The user of the display terminal in the vehicle knows that a communication area outside the moving route is incommunicable. Such an area is thus excluded from the display as unnecessary information.

As a result, only communicable areas for the moving route are displayed, and incommunicable areas outside the moving route are excluded from the display. This simplifies the display information for the user.

A display terminal according to a seventh aspect of the disclosure is a display terminal of one of the first to sixth aspects of the disclosure further including a vehicle number information obtaining unit. The vehicle number information obtaining unit obtains the number of vehicles located in each communicable area. The display controller controls the display unit to display the number of vehicles located in each communicable area.

In this display terminal, the number of vehicles located in each area is obtained, and the number of vehicles in each area appears on the display screen in addition to the moving-route map and the corresponding communicable area.

As a result, the user can determine the number of vehicles that are currently communicating in each area by simply viewing the display screen of the display terminal. In, for example, an overlap area between a plurality of communicable areas, the user may select one of the areas that includes a less number of vehicles to be used for communication. This provides a more comfortable communication environment without, for example, reducing the communication speed.

A display terminal according to an eighth aspect of the disclosure is a display terminal of one of the first to seventh aspects of the disclosure in which the communication unit communicates with a base station via a communication device installed on a vehicle.

The communication unit of the display terminal communicates with one or more base stations via the communication unit installed on the vehicle, such as an airplane.

In this case, for example, a passenger in an airplane can use the display terminal to communicate with a base station via the communication device installed in the airplane.

A display terminal according to a ninth aspect of the disclosure is a display terminal according to one of the first to eighth aspects of the disclosure in which the vehicle is an airplane, and the moving-route map is a flight route map of the airplane obtained from a server installed in the airplane.

In this display terminal, area information indicating a communicable area corresponding to a base station, such as a satellite, is superimposed on the moving-route map of the airplane obtained from the in-flight server of the airplane.

This allows a passenger of the airplane (user of the display terminal) to easily determine a base station (e.g., a satellite) that is currently communicable or the remaining communicable time when moving at a long distance, or for example moving from one continent to another.

A display terminal according to a tenth aspect of the disclosure is a display terminal of one of the first to ninth aspects of the disclosure in which the display terminal is a mobile telephone, a smartphone, a tablet terminal, or a notebook computer, or a monitor installed on an airplane, a train, a bus, or a ship.

As a result, a user of a portable display terminal, such as a mobile telephone or a smartphone, or a passenger of a vehicle, such as an airplane, is effectively provided with information about communicable base stations and other information.

A vehicle server according to an eleventh aspect of the disclosure is a server installed in a vehicle to transmit and receive information to and from a display terminal. The server includes an area information obtaining unit, a map information obtaining unit, and a communication unit. The area information obtaining unit obtains area information indicating a communicable area covered by a base station that is communicable with the display terminal. The map information obtaining unit obtains map information indicating a moving route of the vehicle. The communication unit transmits, to the display terminal, information generated by superimposing the area information on the moving-route map.

In the display terminal that moves inside and outside an area covered by a base station (communicable area) together with a passenger carrying the display terminal or with an owner of the display terminal, the display unit displays one or more communicable areas corresponding to one or more base stations on the moving-route map.

The vehicle may be a vehicle such as an airplane, a train, a bus, or a ship. The area information obtaining unit and the map information obtaining unit may obtain the area information and the map information from an external device, and may also obtain the area information and the map information generated in the vehicle server.

The display terminal can display the communicable area information and the moving-route map information transmitted from the vehicle server and superimposed on each other on its display screen. As a result, the user of the display terminal can simply view the display screen to determine the base station corresponding to the communicable area in which the display terminal is currently located. The user of the display terminal can thus easily determine whether the communication is enabled at the current location.

A vehicle server according to a twelfth aspect of the disclosure is a vehicle server of the eleventh aspect of the disclosure further including an antenna adjustment unit. The antenna adjustment unit adjusts a direction of a movable antenna mounted on the vehicle based on information obtained by the area information obtaining unit and location information indicating a location of the vehicle.

In this vehicle server, the direction of the movable antenna mounted on the vehicle is adjusted based on the location information indicating the location of the vehicle.

As a result, the direction of the antenna is optimized to allow a device located inside a constantly-moving vehicle, such as an airplane, to maintain a comfortable communication environment.

Other Embodiments

Although the disclosure has been described based on the embodiments, the disclosure should not be limited to the above embodiments, and may be modified without departing from the spirit and scope of the disclosure.

(A) In the first and second embodiments, the airplane 2 is an example of the vehicle that moves together with the display terminal. However, the disclosure should not be limited to this.

The vehicle may be a vehicle other than an airplane, such as a train and a ship, or may also be an owner (person) of the display terminal.

The disclosure is applicable to any display terminal that moves through areas covered by multiple terrestrial base stations together with a vehicle or with a person.

(B) In the first and second embodiments, the smartphone 10 communicates with the terrestrial base stations 42a to 42d via the satellites 41a to 41d. However, the disclosure should not be limited to this.

For example, the disclosure is also applicable to movement inside or outside an area covered by a single base station (satellite).

In this case, a display terminal such as a smartphone may display information about the area covered by the single base station or the remaining communicable time on the route map during movement inside the area covered by the single base station.

As a result, the user is provided with information about the location of the user inside the area covered by the single base station, the remaining communicable time, or other information.

When the user enters or leaves the area covered by the single base station, the remaining communicable time or the time taken to enable subsequent communication may be displayed.

(C) In the second embodiment, the in-flight server 54 installed in the airplane is an example of the vehicle server. However, the disclosure should not be limited to this.

For example, the disclosure is also applicable to a server installed in other vehicles, such as a train and a ship.

(D) In the first embodiment, the smartphone 10 is an example of the display terminal. However, the disclosure should not be limited to this.

For example, the disclosure is also applicable to any mobile display terminal, such as a mobile telephone, a tablet computer, and a notebook computer, or to a seat monitor installed in an airplane, a train, or a ship.

(E) In the first embodiment, the areas A to C from the departure to the destination on the moving-route map, which are communicable via the satellites 41a to 41c, overlap with one another as shown in FIG. 3. However, the disclosure should not be limited to this.

Figure 7:
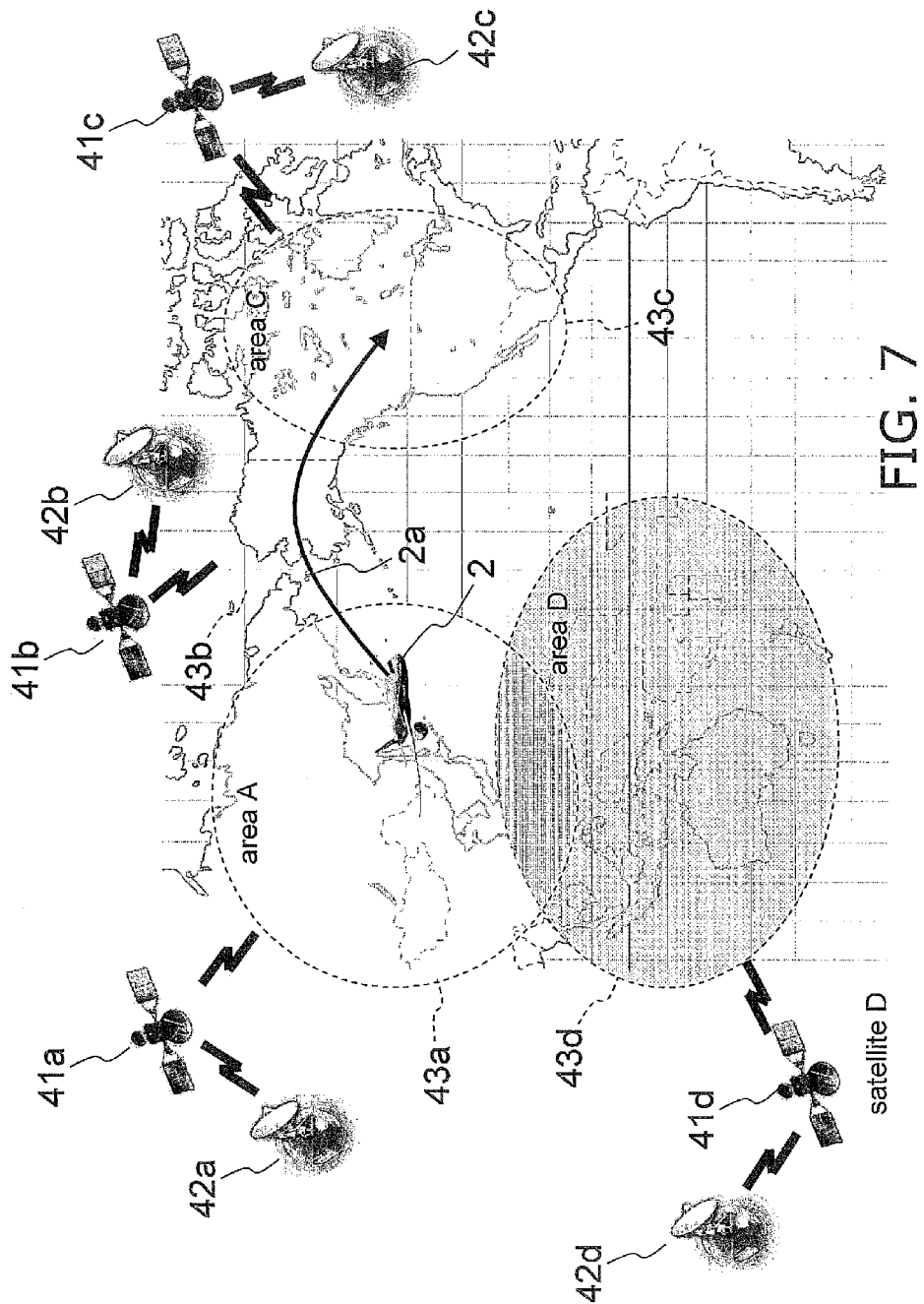
FIG. 7 shows a display example of communicable areas covered by base stations (satellites) superimposed on a moving-route map according to still another embodiment of the disclosure.

For example, the disclosure is also applicable to movement of a display terminal on a moving route shown in FIG. 7, in which communicable areas from the departure to the destination are separated by an incommunicable area in accordance with, for example, the contract conditions for the user of the display terminal.

In this case, the display terminal may display information about the remaining communicable time, the time taken to enable communication in the next area (a base station or a satellite) within the communicable areas A and C. As a result, the user of the display terminal is effectively provided with information about the communicable time period, the time zone in which subsequent communication will be enabled, or other information.

(F) In the above embodiments, as shown in FIG. 5, all the communicable areas A to D appear on the display screen 12a of the smartphone 10. However, the disclosure should not be limited to this.

Figure 9:
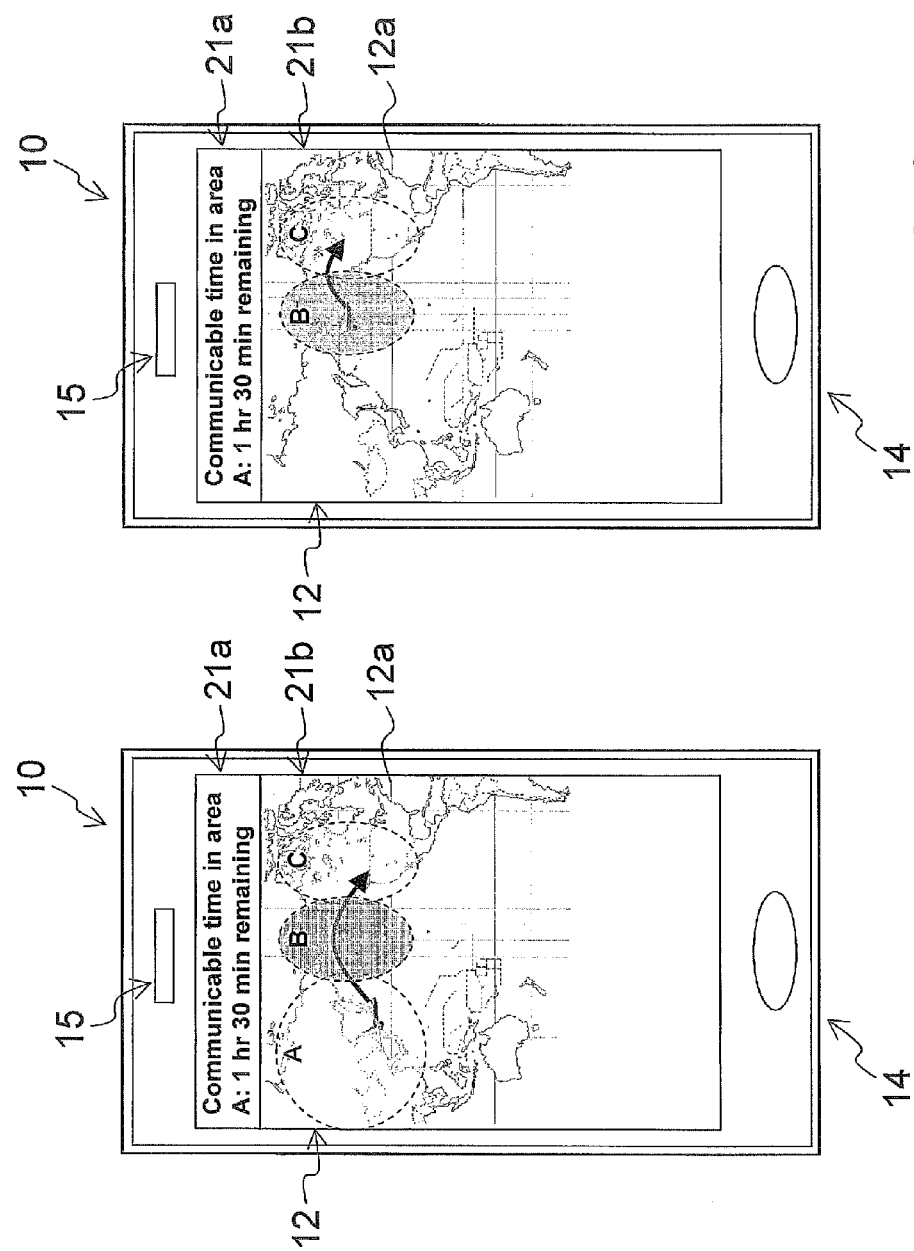
FIGS. 9A and 9B show examples of communicable areas superimposed on a moving-route map according to still another embodiment of the disclosure.

For example, as shown in FIG. 9A, only the areas A to C included in the moving-route map of the airplane 2 may be selectively displayed among the communicable areas A to D.

In this case, the area D outside the moving route is not displayed as shown in FIG. 9A. This simplifies the information appearing on the display screen of the display terminal, such as the smartphone 10.

When only the areas A to C included in the moving-route map of the airplane 2 are selectively displayed among the communicable areas A to D, as shown in FIG. 9B, information about the area A that becomes incommunicable after the airplane 2 moves from the area A to the area B may be eliminated from the display.

This further simplifies the information appearing on the display screen of the display terminal, such as the smartphone 10.

(G) In the above embodiments, the communicable areas A to D, the moving-route map, and the location of the airplane 2 are displayed in a manner superimposed on one another on the display screen 12a of the smartphone 10 as shown in FIG. 5. However, the disclosure should not be limited to this.

Figure 10:
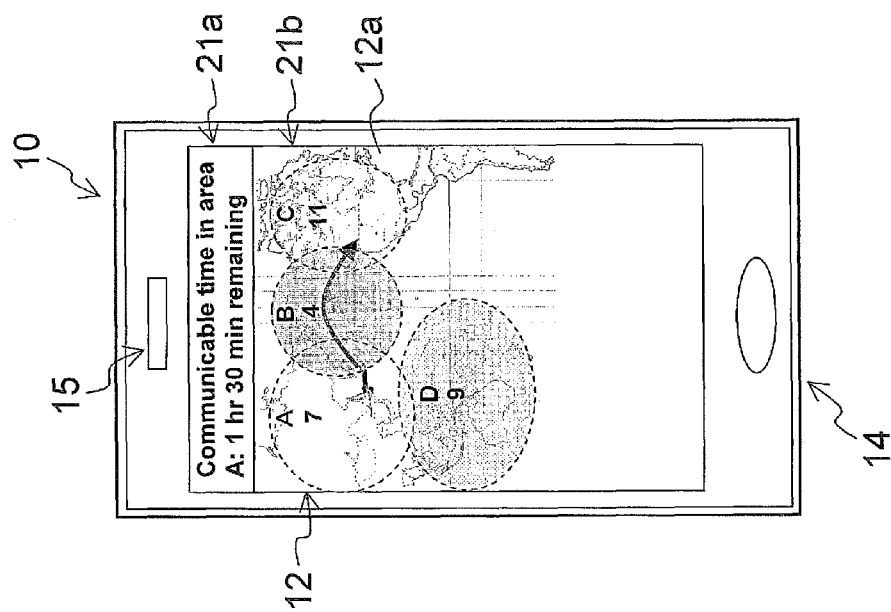
FIG. 10 shows an example of information displayed on a smartphone including the number of airplanes located in each communicable area superimposed on a moving-route map according to still another embodiment of the disclosure.

The disclosure is also applicable to a smartphone 100 shown in FIG. 10, which may further display the number of communicable airplanes 2 located in the areas A to D in addition to the above display information.

Figure 11:
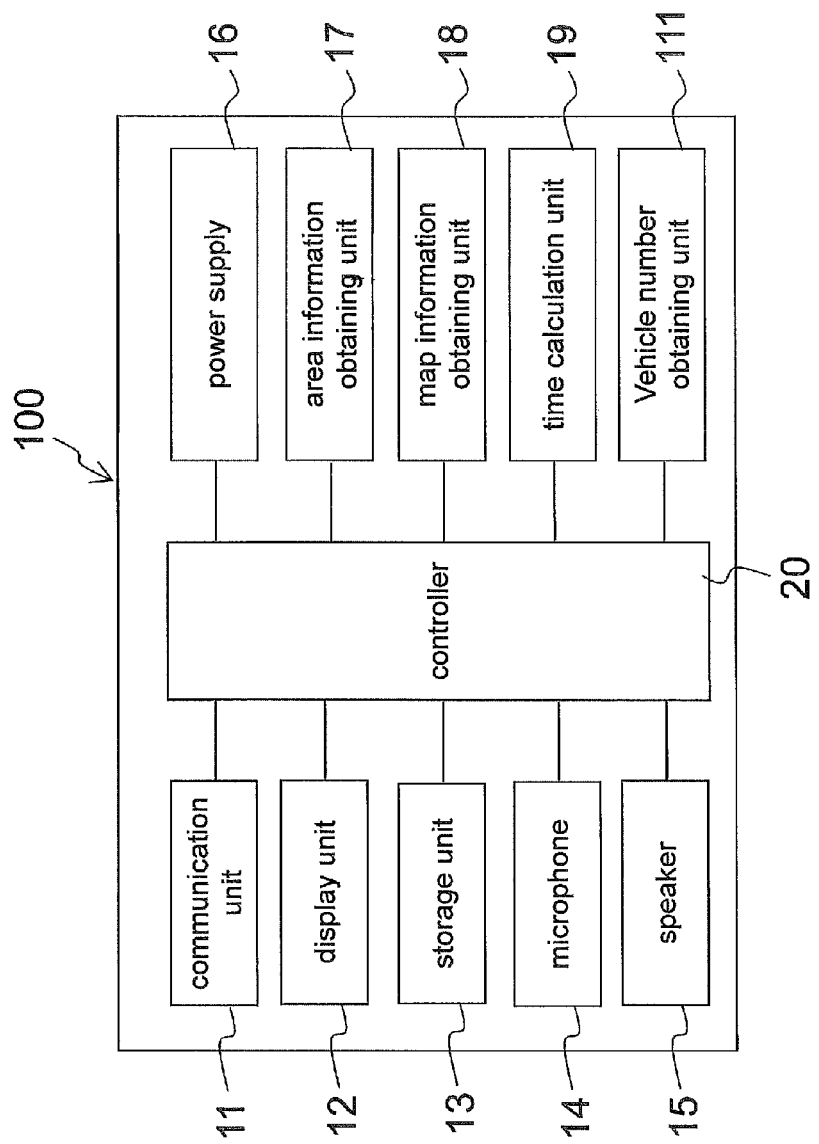
FIG. 11 is a control block diagram showing the structure of the smartphone that displays the information shown in FIG. 10.

As shown in FIG. 11, the smartphone 100 includes a vehicle number obtaining unit 111, in addition to the communication unit 11, the display unit 12, the storage unit 13, and other components.

The vehicle number obtaining unit 111 obtains the number of airplanes 2 that are located in each of the areas A to D and communicate with the satellites 41a to 41d covering the areas A to D. Alternatively, the vehicle number obtaining unit 111 may be arranged in the in-flight server 54. The vehicle number obtaining unit 111 may transmit the information obtained in the in-flight server 54 indicating the number of vehicles in each area to the smartphone 100 located inside the airplane.

In this case, the user is provided with information indicating the number of airplanes 2 currently using the satellites 41a to 41d corresponding to the respective areas A to D. The user can thus easily determine whether the speed of communication performed via the currently used satellite can be reduced.

For example, the area A includes seven airplanes 2, the area B includes four airplanes 2, the area C includes eleven airplanes 2, and the area D includes nine airplanes 2 as shown in FIG. 10.

In this case, when the airplane 2 enters the overlap area between the communicable areas A and B, both the satellites 41a and 41b become usable.

The user of the smartphone 10 may operate the display screen 12a to use the satellite 41b covering the area B, which includes a less number of airplanes 2 (four airplanes) communicating with this satellite. This allows the smartphone 10 to be used in a better communication environment in which the communication speed is less likely to be reduced.

(H) In the above embodiments, the disclosure is applied to the smartphone 10 with communication capabilities. However, the disclosure should not be limited to this.

For example, the disclosure is also applicable to a device without communication capabilities when used solely, such as a monitor installed in the cabin of an airplane or a monitor for cabin attendants.

In this case, the monitor indirectly communicates via, for example, a server installed on the airplane to produce the same advantages as in the above embodiments.

The disclosure is also applicable to a device without communication capabilities when used solely, such as a monitor installed in the cabin of an airplane or a monitor for cabin attendants, when the smartphone 10 indirectly communicates via, for example, a server installed on the airplane. Alternatively, the disclosure is also applicable to the smartphone 10 that does not communicate with a base station directly or indirectly when the monitor installed on the airplane communicates indirectly via, for example, a server. In this case, the display information may be obtained through near-distance communication, such as NFC, between the monitor and the smartphone to produce the same advantages as in the above embodiments.

The disclosure is also applicable to the smartphone 10 that does not communicate with a base station directly or indirectly when, for example, a music receiver without a display screen installed in the cabin of an airplane communicates indirectly via a server installed on the airplane.

(I) In the above embodiments, the map information obtaining unit 18, which functions as a location information obtaining unit, obtains the map information indicating the flight route (moving route) 2a of the airplane 2 superimposed on the world map. However, the disclosure should not be limited to this.

For example, the location information obtained by the location information obtaining unit is not limited to the map information, and may be location information indicating the location of the vehicle.

For example, the map information obtaining unit 18, which functions as an area information obtaining unit, may obtain information about the world map and information about communicable areas covered by the satellites. The location information obtaining unit may then obtain information about the coordinates of the communicable areas corresponding to the world map.

In this case, the display terminal may visualize the location information using the coordinate information and may display the visualized location information in a superimposed manner.

Further, the area information obtaining unit may obtain, as the area information, coordinate information indicating the coordinates for the areas corresponding to the map information obtained by the map information obtaining unit 18.

In this case, the display terminal may visualize the area information using the coordinate information and may display the visualized area information in a superimposed manner, or the disclosure should not be limited to this.

(J) In the above embodiments, the time calculation unit 19 arranged in the smartphone 10 calculates the remaining communicable time in the currently communicating area, and the display unit 12 displays the calculated time. However, the disclosure should not be limited to this.

For example, the in-flight server may calculate the remaining communicable time in the currently communicating area, and may transmit the time information to, for example, the display terminal, such as the smartphone, which can then display the time information.

(K) When, for example, the airplane 2 is flying in the overlap area between the areas A and B shown in FIG. 3, one of the areas A and B is selected in the above embodiments. However, the disclosure should not be limited to this.

In the example shown in FIG. 3, the in-flight server may obtain the number of airplanes currently flying within each of the areas A and B when the airplane 2 is flying in the overlap area between the areas A and B. The information about the number of airplanes may then be used to automatically select one of the areas that includes a less number of airplanes to use the selected area for communication.

As a result, the area with less communication congestion is selected to provide a more comfortable communication environment.

(L) In the above embodiments, one satellite corresponds to one terrestrial base station. However, the disclosure should not be limited to this. For example, two satellites may correspond to one communication target terrestrial base station.

INDUSTRIAL APPLICABILITY

The display terminal of the disclosure displays area information indicating communicable areas and location information indicating the current location of the vehicle in a superimposed manner, and thus allows the user to determine, by a quick view, whether the display terminal is currently communicable. The disclosure is applicable to mobile terminals such as mobile telephones and smartphones, and is also widely applicable to monitors installed on vehicles such as airplanes, trains, and ships.

GENERAL INTERPRETATION OF TERMS

In understanding the scope of the disclosure, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms "including," "having," and their derivatives. Further, the terms "part," "section," "portion," "member," and "element" used in singular form may cover not only singular but also plural.

The term "configured" used to describe components, parts, and portions of an apparatus is intended to mean that the apparatus is configured to achieve an intended function, and/or is intended to cover programmed hardware and/or software.

The terms of degree such as "substantially," "about," and "approximately" as used herein are intended to mean a reasonable amount of deviation of the modified term such that the end result is not significantly changed.

While particular embodiments of the present invention have been indicated and described, it would be obvious to those skilled in the art reading the disclosure that various other changes and modifications can be made without departing from the spirit and scope of the invention. For example, the size, shape, locations or orientations of the components can be modified as necessary and/or as intended. The components that are indicated as directly connected or in contact with each other may have other materials or components interposed between them. The functions of a single element may be implemented by a plurality of elements, or the functions of a plurality of elements may be implemented by a single element. The structure and functions of one embodiment may be applied to other embodiments. A specific embodiment may not produce all the advantages at the same time.

The invention claimed is:

1. A display terminal for moving together with a vehicle, the display terminal comprising:
   an area information obtaining unit configured to obtain area information indicating at least one area communicable directly or indirectly;
   a location information obtaining unit configured to obtain location information indicating a location associated with the vehicle;
   a display unit configured to display the area information and the location information in a superimposed manner; and
   a vehicle number information obtaining unit configured to obtain information indicating the number of vehicles located in each of the at least one communicable area,
   wherein the display unit is configured to display the information indicating the number of vehicles located in each of the at least one communicable area.

2. The display terminal according to claim 1, further comprising:
   a communication unit configured to communicate with a communicable base station directly or indirectly.

3. The display terminal according to claim 2, wherein the communication unit is configured to communicate with a plurality of base stations covering different communicable areas.

4. The display terminal according to claim 2, wherein
the communication unit is configured to communicate with the base station via a communication device installed in the vehicle.

5. The display terminal according to claim 1, wherein
the location information is a route map, and
the display terminal is configured to move together with the vehicle.

6. The display terminal according to claim 5, further comprising:
a time calculation unit configured to calculate a communicable time for which the display terminal is communicable with a base station,
wherein the display unit is configured to display the communicable time calculated by the time calculation unit on the moving-route map.

7. The display terminal according to claim 6, wherein
the time calculation unit is configured to calculate the communicable time based on a current location, a movement speed, and an operation schedule of the vehicle, and the area information indicating an area covered by the base station.

8. The display terminal according to claim 5, wherein
the display controller is configured to control the display unit to display a communicable area included in the moving-route map.

9. The display terminal according to claim 1, wherein
the vehicle is an airplane, and
the location information is a flight route map of the airplane obtained from a server installed in the airplane.

10. The display terminal according to claim 1, wherein
the display terminal is a mobile telephone, a smartphone, a tablet terminal, a notebook computer, or a seat monitor installed in an airplane.

11. A vehicle server that is installed in a vehicle to transmit and receive information to and from a display terminal, the server comprising:
an area information obtaining unit configured to obtain area information indicating at least one area communicable directly or indirectly with the display terminal;
a location information obtaining unit configured to obtain location information indicating a location associated with the vehicle;
a communication unit configured to transmit, to the display terminal, information generated by superimposing the area information on the location information; and
a vehicle number information obtaining unit configured to obtain information indicating the number of vehicles located in each of the at least one communicable area,
wherein the display unit is configured to display the information indicating the number of vehicles located in each of the at least one communicable area.

12. The vehicle server according to claim 11, wherein
the location information is a route map, and
the vehicle is configured to move along a predetermined moving route indicated by the route map.

13. The vehicle server according to claim 11, further comprising:
an antenna adjustment unit configured to adjust a direction of a movable antenna mounted on the vehicle based on information obtained by the area information obtaining unit and information indicating a location of the vehicle.

* * * * *